United States Patent
Kimura et al.

[11] Patent Number: 5,840,380
[45] Date of Patent: Nov. 24, 1998

[54] BASICITY-RESISTANT REFRACTORY

[75] Inventors: Etsuji Kimura; Kenichi Yamaguchi; Fumihiko Ogino, all of Omiya, Japan

[73] Assignee: Mitsubishi Materials Corporation, Tokyo, Japan

[21] Appl. No.: 631,959

[22] Filed: Apr. 15, 1996

Related U.S. Application Data

[63] Continuation of Ser. No. 189,246, Jan. 31, 1994, abandoned.

[30] Foreign Application Priority Data

Aug. 30, 1993 [JP] Japan ................................. 5-237436
Aug. 30, 1993 [JP] Japan ................................. 5-237437

[51] Int. Cl.[6] .................................................. B32B 17/00
[52] U.S. Cl. ...................... 428/34.4; 428/34.6; 428/457; 428/469; 428/472; 428/701; 428/702
[58] Field of Search ................................. 428/701, 702

[56] References Cited

U.S. PATENT DOCUMENTS

| | | | |
|---|---|---|---|
| 3,578,473 | 5/1971 | Alper | 501/108 |
| 4,050,956 | 9/1977 | de Bruin | 148/6 |
| 4,389,492 | 6/1983 | Tanemura | 501/112 |
| 4,503,128 | 3/1985 | Iseli | 428/446 |
| 4,639,388 | 1/1987 | Ainsworth | 428/117 |
| 4,971,934 | 11/1990 | Schiavi | 501/120 |
| 5,158,915 | 10/1992 | Morita | 501/108 |
| 5,171,724 | 12/1992 | Iwadoh | 501/120 |
| 5,175,132 | 12/1992 | Ketcham | 501/103 |

FOREIGN PATENT DOCUMENTS 937421  6/1982  U.S.S.R. ................ 501/120

Primary Examiner—Timothy M. Speer
Attorney, Agent, or Firm—Kubovcik & Kubovcik

[57] ABSTRACT

A basicity-resistant refractory wherein the substratum includes a surface layer of a composite oxide of which magnesium oxide is the main component, and an oxide as a second component and which forms a high melting point composite oxide with magnesium oxide and iron oxides through reaction with iron oxides in a melt or a calcined mass. The oxide which is the second component may be one or more of titanium oxide, niobium oxide, neodymium oxide, lanthanum oxide, manganese oxide, nickel oxide, and cobalt oxide.

15 Claims, 4 Drawing Sheets

BASICITY-RESISTANT REFRACTORY

This application is a continuation of application Ser. No. 08/189,246, filed Jan. 31, 1994, now abandoned.

DETAILED DESCRIPTION OF THE INVENTION

1. Field of the Invention

The present invention relates to a refractory excellent in resistance to basic materials (hereinafter referred to as a "basicity-resistant refractory"). The refractory of the present invention is useful particularly as a material for a refractory brick and a furnace tube for a refining furnace or a kiln, which contact a basic melt or a calcined mass such as those containing much iron oxides.

2. Description of the Related Art

For the purpose of protecting furnace components from high temperatures, the walls of various furnaces used for smelting/refining metals and various kilns used for manufacturing cement are lined with refractory materials. Refractory materials are used also for crucibles, furnace tubes, muffles and other appliances in which contents are melted at high temperatures. These refractories include, depending upon service environments, acidic refractories mainly containing $SiO_2$ or $ZrO_2$, neutral refractories mainly containing $Cr_2O_3$ or $Al_2O_3$, and basic refractories mainly containing MgO or CaO. For example, a basic refractory is used in an environment in which it is exposed to a basic melt, a calcined mass or gases.

Among basic refractory bricks which are representative of refractory materials, the conventional basic refractory bricks popularly in use include one comprising Mg oxide only and Mg oxide-Cr oxide ones where Cr oxide is included to improve erosion resistance. This Mg oxide-Cr oxide brick, which has the advantage of being high in refractoriness and refractoriness under load, is defective in that chrome and oxides thereof cause pollution, so that there is a demand for replacement. While the Mg oxide-Cr oxide bricks exhibit a satisfactory erosion resistance against basic melts, the erosion resistance of such bricks is limited with respect to high-temperature basic melts rich in Fe oxides. This is attributable to the fact that, upon contact with high-temperature basic melts, Mg oxide and Cr oxide contained in this refractory react with Fe oxides in the melt and form spinels respectively expressed as $MgFe_2O_4$ and $FeCr_2O_4$.

As shown in the schematic representation of FIG. 5, an Mg oxide-Cr oxide refractory brick 50 has a structure in which Mg oxide particles 51 and Cr oxide particles 52 are mutually integrally sintered. Upon contact with a high-temperature melt 54 rich in Fe oxides, the melt 54 penetrates through gaps between particles into the surface layer of the brick 50, and Fe oxides in the melt react with Mg oxide and Cr oxide, respectively, thus forming spinel phases 53, rich in iron and expressed as $MgFe_2O_4$ and $FeCr_2O_4$, along grain boundaries of the surface layer. During formation of these spinel phases, crystal grains of the above-mentioned particles are expanded, and as a result, contact between Mg oxide particles 51 and Cr oxide particles 52 of the non-spinel phase, which have been integrally sintered, is broken. $MgFe_2O_4$, a spinel component, tends to be easily eroded by alkaline components in the melt, in spite of the high melting point of 1,900° C. The surface layer of the refractory brick 50 is considered to be eroded and damaged for these reasons.

Because erosion resistance of the Mg oxide-Cr oxide refractory brick is limited in effect against a high-temperature basic melt rich in Fe oxides, it is inevitable to take measures such as the use of electrocast bricks at areas subject to serious erosion of refractory bricks in a smelting/refining furnace or a kiln in which such melt and calcined mass are produced. This causes a heavy economic burden. There is, therefore, a demand for a basic refractory brick excellent in erosion resistance to take the place of Mg oxide-Cr oxide refractory bricks.

For cement kilns, the use of a Mg oxide-Al oxide refractory brick in place of the above-mentioned Mg oxide-Cr oxide refractory brick has been tried. This brick is, however, still low in erosion resistance against a basic calcined mass rich in Fe oxides.

The present invention has an object, therefore, to provide a basicity-resistant refractory which solves the problems as described above of the conventional Mg oxide-Cr oxide refractory brick and the like.

SUMMARY OF THE INVENTION

Various studies were carried out concerning means to solve the above-mentioned problems. As a result, it was found that a basicity-resistant refractory brick excellent in erosion resistance against a basic melt rich in Fe oxides can be obtained by including, as second components, oxides forming a high-melting-point composite oxide with Mg oxide-Fe oxide through reaction with Fe oxides in a melt, together with Mg oxide, the main component, in a refractory, and covering the surface layer and refractory particles of the surface layer of the refractory with the above-mentioned composite oxide formed upon contact of the refractory with the melt. This refractory has been found to be a most suitable material as a basicity-resistant refractory brick.

Suitable second components of the refractory include Ti oxide, Nb oxide, Nd oxide, La oxide, Mn oxide, Ni oxide and Co oxide which have not conventionally been used, and the findings obtained teach that a desired refractory is available by adding one or more of these oxides.

It was found that this refractory having a higher sintering density provides a better thermal shock resistance, and suitability of the refractory as a material for a furnace tube and a protecting tube of thermocouple has been confirmed.

Another finding is that a particularly excellent erosion resistance against a basic melt is available by previously covering the surface of the refractory with a composite oxide excellent in resistance to basic materials, which comprises the above-mentioned Mg oxide, Fe oxide and one or more of the second component oxides to prevent penetration of the melt into the refractory, and this embodiment is the most suitable as a basicity-resistant refractory brick.

A brick prepared by providing a layer of the above-mentioned composite oxide on a refractory substratum having a relatively low sintering density such as a brick is suitable as a basicity-resistance brick. A refractory having a layer of the composite oxide, being excellent in heat conductivity and thermal shock resistance, was confirmed to be suitable as a material for a furnace tube and a protecting tube of a thermocouple.

The present invention provides the following basicity-resistant refractory materials:

(1) A basicity-resistant refractory wherein the substratum includes a surface layer of a mixture of oxides comprising magnesium oxide which is the main component, and an oxide which is the second component and which forms a high-melting-point composite oxide with magnesium oxide and iron oxides through reaction with iron oxides in a melt or a calcined mass.

(2) A basicity-resistant refractory as described above in (1), wherein the oxide which is the second component comprises one or more oxides selected from the group consisting of titanium oxide, niobium oxide, neodymium oxide, lanthanum oxide, manganese oxide, nickel oxide and cobalt oxide.

(3) A basicity-resistant refractory as described above in (1), wherein said refractory has a content of the oxide which is the second component within a range of from 0.1 to 50 wt. %.

(4) A basicity-resistant refractory as described above in (1), wherein said refractory contains aluminum oxide in an amount within a range of from 1 to 20 wt. %, in addition to the oxide which is the second component.

(5) A basicity-resistant refractory as described above in (1), wherein the substratum is a refractory comprising an oxide having the same composition as the substratum surface.

(6) A basicity-resistant refractory as described above in (1), wherein the substratum is a metal.

(7) A basicity-resistant refractory as described above in (1), wherein the substratum surface comprises iron oxides in addition to magnesium oxide and the second component.

(8) A basicity-resistant refractory as described above in (7), wherein the substratum surface is a composite oxide having a high melting point and mainly comprises magnesium oxide.

(9) A basicity-resistant refractory as described above in (7), wherein the substratum surface is a composite oxide having a high melting point, mainly comprising magnesium oxide and containing aluminum oxide in an amount within a range of from 1 to 20 wt. %.

(10) A basicity-resistant refractory as described above in (7), wherein the substratum is a metal.

(11) A brick for lining a smelting/refining furnace, which comprises the basicity-resistant refractory described above in (1).

(12) A brick for a connecting runner (transfer runner for high-temperature melt) of a smelting/refining furnace, which comprises the basicity-resistant refractory as described above in (1).

(13) A thermocouple protecting tube comprising the basicity-resistant refractory as described above in (1).

(14) A radiation tube for an optical pyrometer, which comprises the basicity-resistant refractory as described above in (1).

Description of the Symbols

A: High-melting-point composite oxide phase
B: $MgFe_2O_4$ spinel phase
C: Refractory
D: Slag
E: Interior of refractory

DESCRIPTION OF PREFERRED EMBODIMENTS

The refractory of the present invention has a substratum surface, or surface layer, containing Mg oxide as the main component and the above-mentioned second component. The Mg oxide content should be within a range of from 50 to 99.9 wt. %, and more preferably, from 80 to 95 wt. %. With an Mg oxide content of under 50 wt. %, refractoriness is insufficient. With an Mg oxide content of over 99.9 wt. %, on the other hand, the effects of the present invention cannot be fully displayed.

Second component oxides useful in the invention as described above include $TiO_2$, $Nb_2O_3$, $Nd_2O_3$, $La_2O_3$, $Mn_3O_4$, $NiO$, and $Co_3O_4$, and one or more of these oxides should be used. The content of each of these oxides, being determined with reference to the properties the product is required to have, the manufacturing conditions of the refractory and raw materials cost, should be within a range of from about 0.1 to 50 wt. %, and more preferably, from 2 to 20 wt. %. With a content of the second component of under 0.1 wt. %, a sufficient erosion resistance is unavailable. A content of over 50 wt. % leads, on the other hand, to an insufficient high-temperature strength as evaluated by means of the creep deformability or refractoriness under load of the refractory, or may cause cracks as a result of strain during manufacturing of the refractory.

The excellent erosion resistance of the refractory of the present invention against a basic metal rich in Fe oxides is believed to be attributed to the fact that, upon contact of the refractory with a melt rich in Fe oxides, Fe oxides in the melt, Mg oxide and the second component, e.g., Ti oxide, form a ternary solid-solution composite oxide such as $MgO—TiO_2—Fe_2O_3$, and this composite oxide prevents penetration of the melt into the refractory by covering and protecting the refractory surface.

Figure 3:
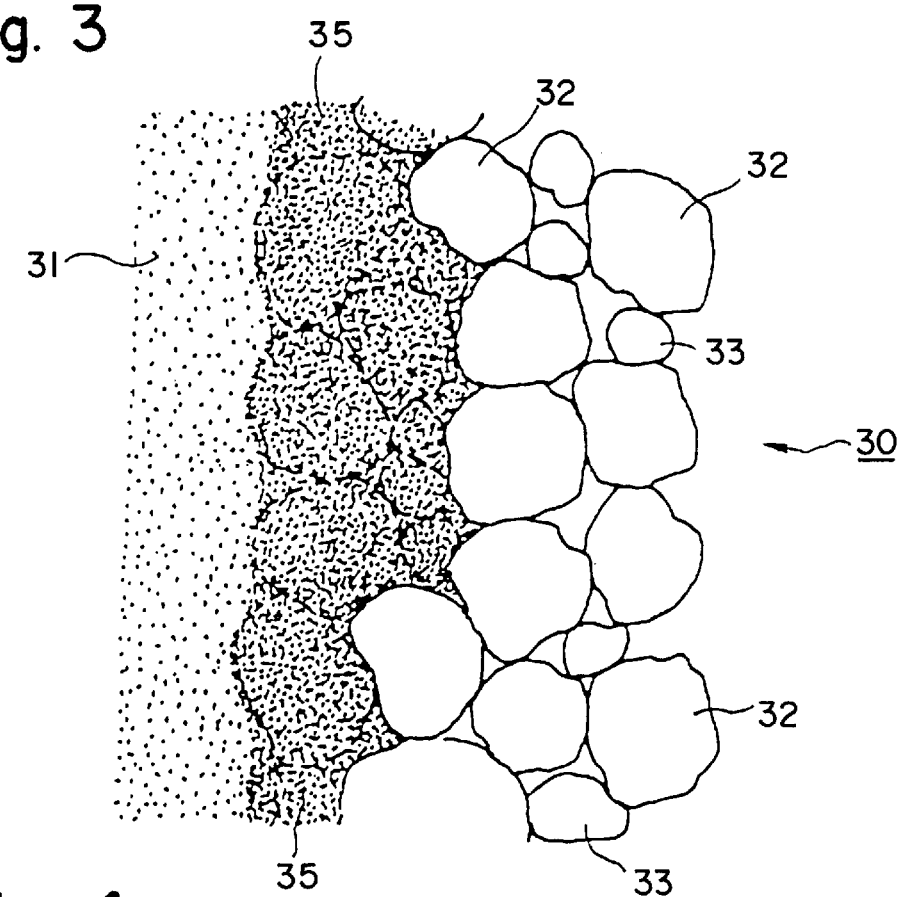
FIG. 3 is a schematic representation illustrating changes in composition near the interface between the refractory and the slag in embodiment 2.

An $MgO—TiO_2$ refractory is illustrated as an example schematically in FIG. 3. Upon contact of the $MgO—TiO_2$ refractory 30 with a high-temperature melt 31 rich in Fe oxides, the melt 31 penetrates through gaps between Mg oxide particles 32 and Ti oxide particles 33 into the surface layer and fills these gaps. A ternary composite oxide 35 comprising $MgO—TiO_2—Fe_2O_3$ is thus formed through reaction of the main component Mg oxide and the second component Ti oxide with Fe oxides in the melt. In the ternary constitution diagram of $MgO—TiO_2—Fe_2O_3$, the composite oxide is a solid-solution high-melting-point composite oxide (Magnesiowustite) having a melting point of about 1,750° C. within an MgO side region drawn by connecting two points representing an MgO content relative to $TiO_2$ of 42 wt. % and an MgO content relative to $Fe_2O_3$ of 8 wt. %. This oxide fills the surface layer, covers the refractory surface, and prevents the melt from penetrating into the refractory. Unlike the above-mentioned spinel phase, furthermore, this oxide does not cause expansion of sintered particles constituting the refractory, and hence does not cause strength degradation of the refractory, whereby the refractory is hard to be eroded by alkaline components in the melt and displays an excellent erosion resistance.

The substratum of the refractory of the present invention may be a mixture of oxides having the same integral composition as the substratum surface layer, or a refractory having an oxide different in composition from that of the substratum surface layer, or a metal.

The refractory of the present invention can contain $Al_2O_3$ in an amount within a range of from 1 to 20 wt. %, and more preferably, from 5 to 10 wt. %. Addition of $Al_2O_3$ increases density and improves erosion resistance.

The refractory of the present invention can be manufactured in accordance with usual manufacturing methods. In the manufacture of a refractory, in general, a refractory having a desired porosity, material strength and resistance to a melt is available by classifying raw material oxides into coarse particles (particle size of from about 2 to 5 mm), medium particles (particle size of about 1 mm) and fine particles (particle size of up to 0.1 mm), and mixing these classes of particles at prescribed blending ratios. The refractory of the present invention can also be manufactured by mixing and sintering various classes of raw material particles at prescribed ratios. The various metal oxides serving as the second components should preferably be added in the form of particles finer than the particles of Mg oxide. When the particle size of the second component is smaller than the Mg oxide particles, the second component oxide particles surround the main component Mg oxide particles, and upon contact of the refractory with the melt, the above-mentioned composite oxide is easily formed around the Mg oxide particles. It is, therefore, possible to obtain desired effects with the second component in a relatively small amount. It thus suffices that the second component prevails in quantity near grain boundaries of the Mg oxide particles. It is, therefore, possible to obtain the effects of the present invention with a small amount of addition by using the second component particles having a particle size smaller than that of the Mg oxide particles.

It is possible to manufacture a refractory having a relatively low density as represented by a porosity within a range of from 12 to 20%, for example, by mixing coarse, medium and fine Mg oxide particles at ratios of from 10 to 50 wt. %, from 10 to 50 wt. % and from 10 to 50 wt. %, respectively, adding a second component oxide having a particle size of under several hundred $\mu$m, kneading the mixture, forming a green compact by compression of the mixture, and firing the same at a temperature of from 1,400° to 1,700° C. for five to 30 hours.

A refractory having a relatively high density, as represented by a compactness of at least 90% (a porosity of up to 10%), can be manufactured by adding a second component oxide having a particle size of up to 50 $\mu$m to Mg oxide powder (average particle size of up to 100 $\mu$m), kneading the mixture, forming a green compact by compression of the mixture, and then firing the formed mixture at a temperature of from 1,500° to 1,700° C. for one to ten hours.

The above-mentioned low-density refractory is suitable as a refractory brick for lining a smelting/refining furnace of a basic melt, because of the presence of many voids which leads to a high heat insulating effect. The above-mentioned high-density refractory is suitable as a material for a crucible and a furnace tube for melting a basic raw material because of the densely sintered Mg oxide and Ti oxide particles, a high solid thermal conductivity through these particles, and a satisfactory heat conductivity. This high-density refractory is also useful for a protecting tube of a sensor for a high-temperature melt for which an alumina tube has conventionally been used, such as various measuring probes in contact with a high-temperature melt, including a thermocouple.

In the manufacture of the refractory of the present invention, the surface of the substratum may previously be brought into contact with iron oxide to form a layer of the above-mentioned high-melting-point composite oxide. The composite oxide as described above is typically a ternary oxide comprising Mg oxide as the main component, one or more oxides selected from the group consisting of Ti oxide, Nb oxide, Nd oxide, La oxide, Mn oxide, Ni oxide and Co oxide, and iron oxide. One or more of the oxides selected from the group consisting of Ti oxide, Nb oxide, Nd oxide, La oxide, Mn oxide, Ni oxide and Co oxide is (are) hereinafter referred to as the second component.

The above-mentioned composite oxide, for example, an $MgO$—$TiO_2$—$Fe_2O_3$ ternary oxide having an MgO content of not less than 40 wt. % forms a solid-solution phase high-melting-point composite oxide which is hard to be eroded by alkaline components in a basic melt or a basic calcined mass. It is, therefore, possible to prevent a basic melt from penetrating into the refractory, thus preventing erosion of the refractory, by covering the refractory surface with a layer of the composite oxide.

The content ratios of MgO, $Fe_2O_3$ and the second component in the above-mentioned composite oxide depend upon the kind of the second component. In the ternary constitution diagram representing the $MgO$—$TiO_2$—$Fe_2O_3$ system where Ti oxide is the second component, a solid-solution high-melting-point composite oxide (Magnesiowustite) having a melting point of about 1,750° C. is formed within an MgO side region drawn by connecting two points representing an amount of MgO relative to $TiO_2$ of 42 wt. % and an amount of MgO relative to $Fe_2O_3$ of 8 wt. %. Amounts of $TiO_2$ and $Fe_2O_3$ exceeding this region are not desirable because a spinel phase containing much low-melting-point iron oxide is formed.

The thickness of the layer of the composite oxide varies with the kind of substratum refractory. In a basicity-resistant refractory brick mainly comprising Mg oxide, as an example, a thickness of from 0.01 to 10 mm is appropriate. With a thickness smaller than this, a sufficient erosion resistance cannot be expected, whereas a thickness larger than this leads, on the other hand, to decreased strength of the refractory when in the form of a structure.

For a refractory having a high density such as a protecting tube of a thermocouple inserted into a high-temperature melt, the thickness of the composite oxide layer should preferably be within a range of from 0.1 to 1 mm.

A commonly used MgO refractory brick may be used as the substratum of a refractory on which the above-mentioned composite oxide layer is formed. This Mg oxide refractory brick may contain subcomponents within the usual ranges. Also this Mg oxide refractory brick may contain $Al_2O_3$ in an amount within a range of from 1 to 20 wt. %, and more preferably, from 5 to 10 wt. %. Addition of $Al_2O_3$ results in a higher compactness and an improved erosion resistance.

The above-mentioned composite oxide layer can be formed by covering the surface of a substratum mainly containing Mg oxide with a mixture of the above-mentioned second component and $Fe_2O_3$ and heating the resultant substratum, or covering the surface of a substratum mainly containing Mg oxide and containing the second component with a mixture containing $Fe_2O_3$ and heating the resultant substratum. More specifically, this comprises: (i) covering the surface of the substratum, after forming but before firing, with powder containing $Fe_2O_3$ and firing the same at a temperature of at least 1,300° C.; or (ii) immersing the fired substratum in a melt containing $Fe_2O_3$. As required in the case of (ii), the substratum is further fired after immersion to cause the layer of composite oxide to firmly deposit and adhere on the substratum.

Formation of the above-mentioned composite oxide layer on the surface of the refractory substratum by covering the surface with a mixture containing Mg oxide and second component, e.g., Ti oxide, and immersing the same in a melt rich in Fe oxides is illustrated in the same schematic representation as in FIG. 3 described above. As shown in the drawing, upon contact of the $MgO$—$TiO_2$ surface layer 30 with the high-temperature melt 31 rich in Fe oxides, the melt 31 penetrates through gaps between Mg oxide particles 32 and Ti oxide particles 33 into the surface layer, and fills the gaps between the particles. The main component Mg oxide and the second component Ti oxide react with Fe oxides in the melt, thereby forming a ternary composite oxide 35 comprising $MgO$—$TiO_2$—$Fe_2O_3$. This composite oxide 35 is a solid-solution high-melting-point oxide which fills the surface layer, covers the surface of the refractory, and thus prevents penetration of the melt into the refractory. Unlike the above-mentioned spinel phase, this composite oxide does not cause expansion of sintered particles constituting the refractory, so that degradation of the strength of the refractory is not caused and the composite oxide is resistant to erosion by alkaline components contained in the melt, thus permitting full display of an excellent erosion resistance.

Basicity-resistant refractories adapted to a wide range of uses are available by providing the above-mentioned surface layer on each of various refractories having different sintering densities of the substrata thereof. For example, a brick having a relatively low sintering density is applicable as a lining material for a furnace because of the high heat insulating effect brought about by internal voids. A brick provided with a surface layer comprising the above-mentioned composite oxide on the surface of a refractory mainly consisting of Mg oxide is suitable for lining a furnace for a basic melt or a calcined mass, because of the excellent erosion resistance against such a basic melt. A refractory having a high sintering density has, on the other hand, a satisfactory heat conductivity because of the densely sintered inner particles. A brick having a substratum comprising such a refractory and provided with the above-mentioned composite oxide layer is therefore suitable as a material for a crucible or a furnace tube. Since the above-mentioned composite oxide is excellent also in thermal shock resistance, a brick formed by providing the above-mentioned surface layer on a high-density refractory is suitable as a protecting tube for a sensor of a high-temperature melt such as various measuring terminals including thermocouples for which an alumina tube has conventionally been used.

EXAMPLES AND COMPARATIVE EXAMPLES

Examples of the present invention are described below, together with comparative examples. The examples are intended only for illustration purposes, and are not intended to limit the scope of the present invention.

Example 1

Sample pellets each weighing about 7 g were prepared by mixing 80 wt. % MgO powder having a particle size of from 40 $\mu$m to 200 $\mu$m and 20 wt. % $TiO_2$ having a particle size of from 40 $\mu$m to 200 $\mu$m, forming the mixture into a cylindrical shape under a pressure of 1,500 $kg/cm^2$, and firing the green compact in the open air at 1,500° C. for 48 hours. The sample pellets had an apparent specific gravity of 3.07 $g/cm^3$, a true specific gravity of 3.63 $g/cm^3$ and an apparent porosity of 15.43%, all these figures suggesting a satisfactory sintering property.

Figure 1:
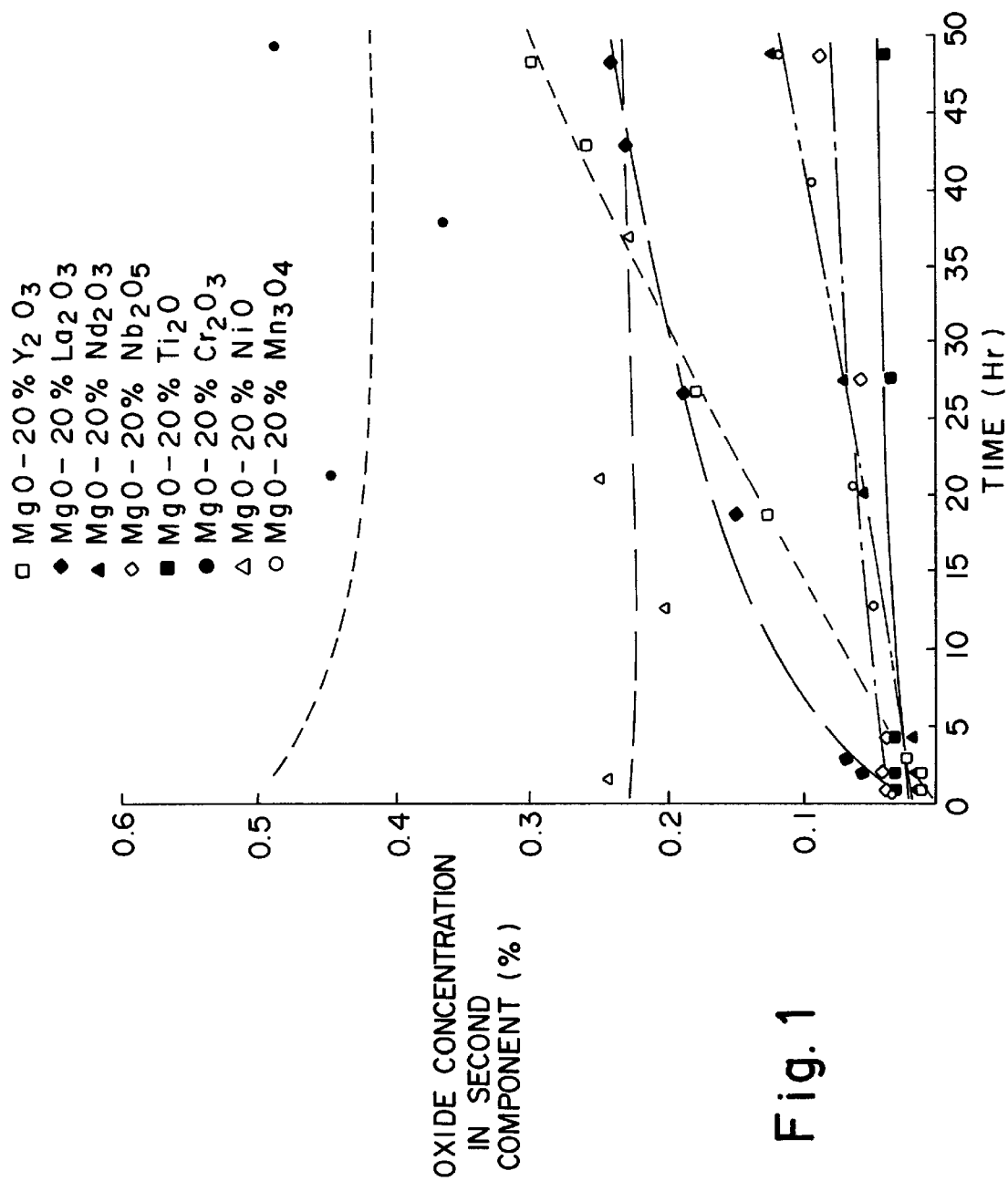
FIG. 1 is a graph illustrating the relationship between the concentration of the second component oxide in a slag and immersion time when immersing the refractory of the present invention and a conventional refractory in the slag.
Figure 2:
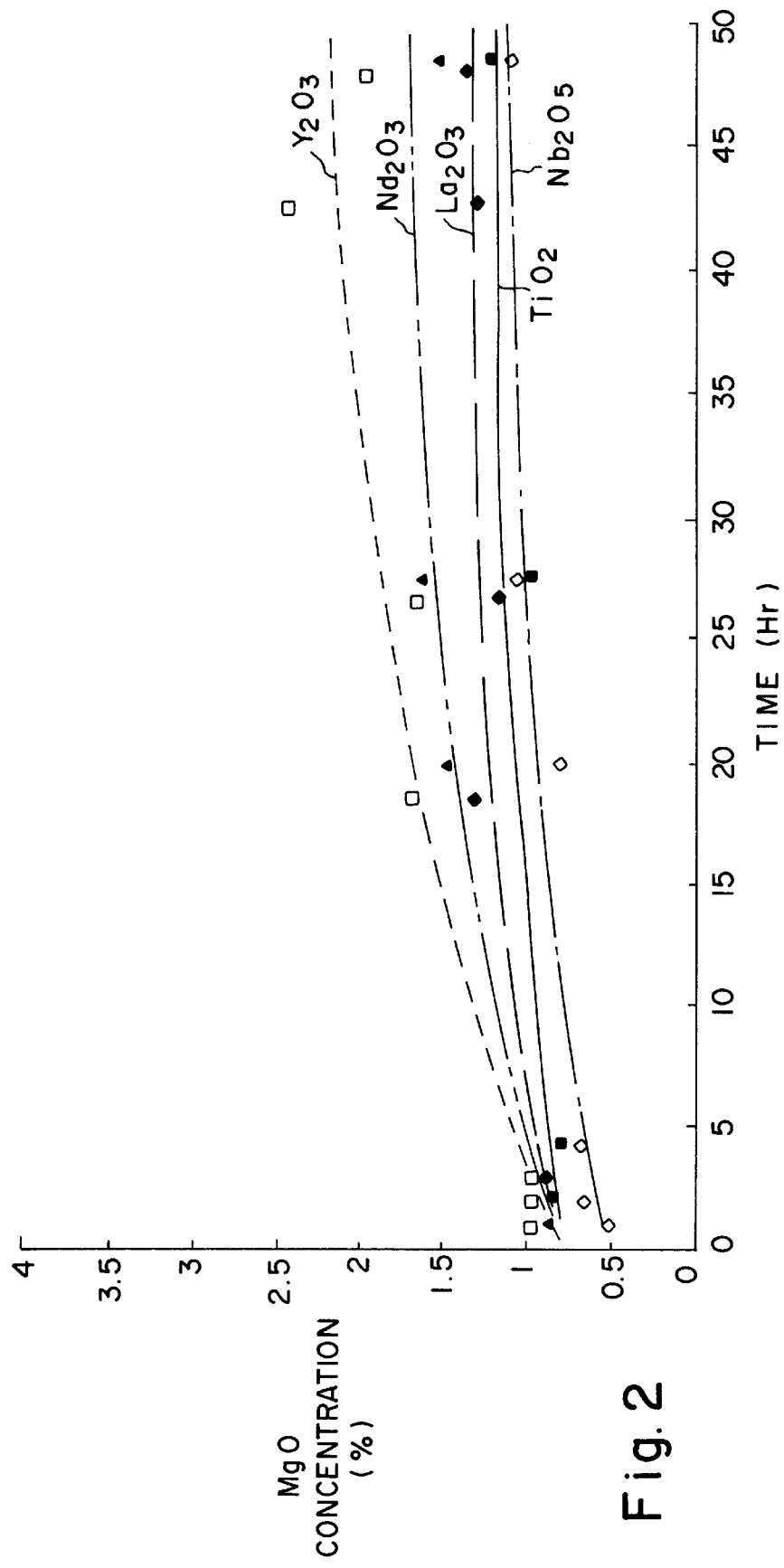
FIG. 2 is a graph illustrating the relationship between the concentration of Mg oxide in a slag and immersion time when immersing the refractory of the present invention and the refractory of the conventional art.

The sample pellets were immersed in 200 g of calcium ferrite slag (composition in wt. %: $Fe_2O_3$: 70, CaO: 15, and $Cu_2O$: 15; corresponding to the composition of a slag in copper smelting), and held for 48 hours to investigate erosion resistance. As a result, no marked change was observed in the exterior of the pellet. To examine erosion resistance more in detail, the slag was sampled with a steel rod at certain intervals of time during immersion of the pellets into the slag, and amounts of $TiO_2$ and MgO dissolved into the slag were measured. The results are shown in FIGS. 1 and 2, respectively. As shown in the drawings, dissolution of these components into the slag is on a very low level, and no considerable change occurred with time.

Example 2

Figure 4:
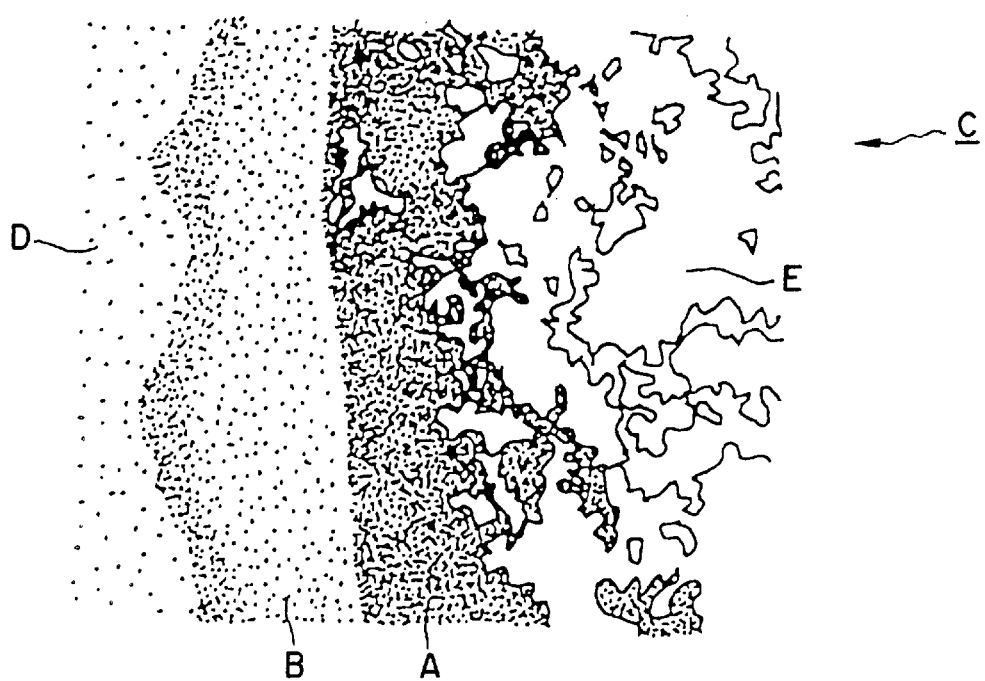
FIG. 4 is a schematic representation illustrating changes in composition near the interface upon immersion of the refractory of the present invention in a slag.
Figure 5:
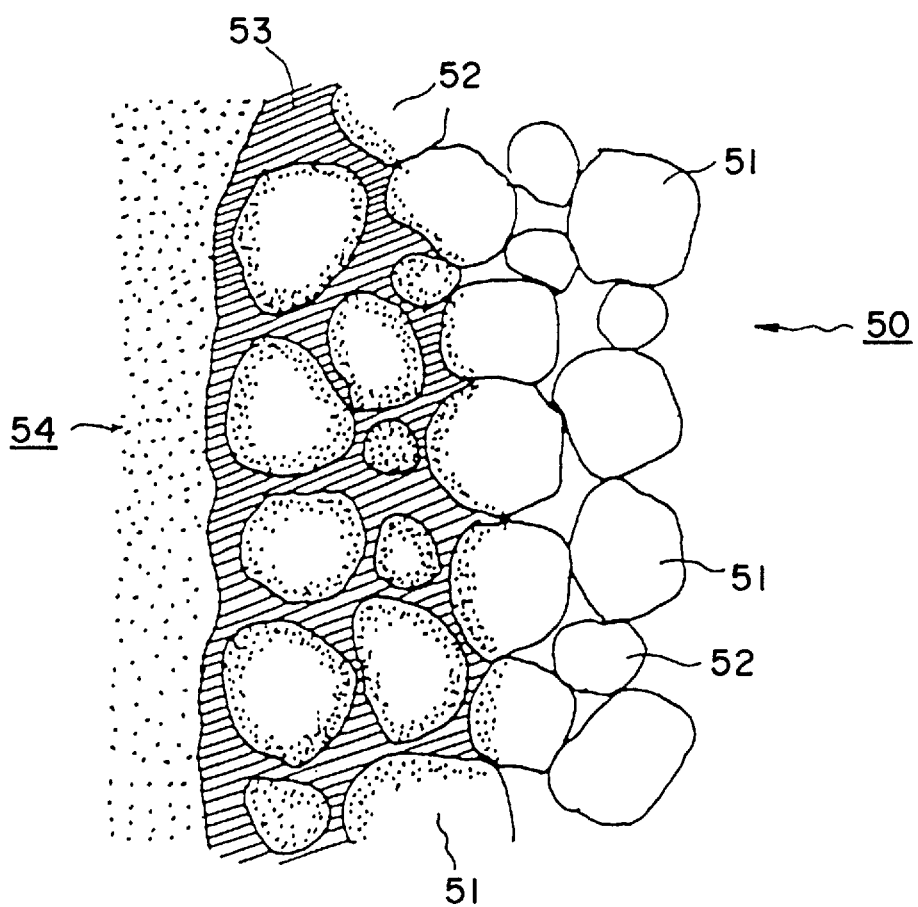
FIG. 5 is a schematic representation illustrating erosion of a conventional Mg oxide-Cr oxide brick.

For a further study on erosion resistance, an EPMA analysis was carried out on the interface between the $MgO$—$TiO_2$ pellet after the lapse of 48 hours of slag immersion and the calcium ferrite slag used in Example 1. As shown in FIG. 4, there are observed two phases in the contact portion between slag D and the refractory C. The phase A closer to the refractory is a solid-solution phase mainly comprising three components of $MgO$—$TiO_2$—$Fe_2O_3$ (MgO: 39.27 wt. %, $TiO_2$: 35.40 wt. %, $Fe_2O_3$: 18.86 wt. %, $Cu_2O$: 1.19 wt. % and CaO: 0.16 wt. %), and the phase B closer to the slag is a spinel phase of $MgFe_2O_4$. The solid-solution phase is a composite metal oxide phase having a melting point of about 1,900° C., and the surface layer of the refractory is covered with this composite oxide phase. As a result, the slag does not penetrate into the refractory formed with integrally sintered MgO particles and $TiO_2$ particles in the interior thereof, and thus erosion by slag is prevented.

Example 3

Sample pellets having a composition as shown in Table 1 were prepared in the same manner as in Example 1, and were immersed in a calcium ferrite slag to investigate erosion resistance. The property and erosion resistance of each sample pellet are also shown in Table 1 (the symbols in Table 1 mean: ◎: excellent, ○: satisfactory, Δ: fair, x: not applicable). Sample 1 is the same as in Example 1.

As shown in Table 1, the refractory of the present invention is excellent in sintering property and erosion resistance. As is clear from samples 9 and 10, sintering property does not necessarily correspond to erosion resistance. This suggests that the effects of the present invention are not brought about by the improvement of the sintering property alone of the refractory.

TABLE 1

| Sample | Components | Apparent specific gravity | True specific gravity | Apparent porosity | Sintering property | Erosion resistance |
|---|---|---|---|---|---|---|
| 1 | $MgO$—$TiO_2$ | 3.07 | 3.63 | 15.43 | ◎ | ○ |
| 2 | $MgO$—$Nb_2O_5$ | 3.15 | 3.73 | 15.55 | ○ | ◎ |
| 3 | $MgO$—$Nd_2O_3$ | 3.64 | 3.98 | 8.54 | ◎ | Δ |
| 4 | $MgO$—$La_2O_3$ | 3.76 | 3.91 | 3.84 | ◎ | ○ |
| 5 | $MgO$—$Mn_3O_4$ | 3.19 | 3.77 | 15.38 | ○ | ○ |

TABLE 1-continued

| Sample | Components | Apparent specific gravity | True specific gravity | Apparent porosity | Sintering property | Erosion resistance |
|---|---|---|---|---|---|---|
| 6 | MgO—NiO | 3.04 | 3.97 | 23.43 | Δ | ○ |
| 7 | MgO—Co$_3$O$_4$ | 3.03 | 3.91 | 22.51 | Δ | Δ |
| 8 | MgO—Cr$_2$O$_3$ | 2.36 | 3.82 | 38.22 | Δ | x |
| 9 | MgO—Y$_2$O$_3$ | 3.52 | 3.80 | 7.37 | ⊚ | x |
| 10 | TiO$_2$ | 3.76 | 3.84 | 2.08 | ⊚ | x |

Note: 1) Sample pellets other than Comparative Example 10 have a composition: MgO (80 wt. %)-X$_m$O$_n$ (20 wt. %).

2) Apparent specific gravity and true specific gravity are expressed in the units (g/cm$^3$).

3) Sample 10 was dissolved in about an hour.

4) Samples 1 to 7 are examples of the present invention, and Samples 8 to 10 are comparative examples.

To more clearly show the results, the concentration of the above-mentioned second component dissolved into the slag was measured in the same manner as in Example 1 for some samples other than Example 1, as well. The results are shown in FIG. 1. FIG. 2 illustrates changes with time in the amount of MgO dissolved into the calcium ferrite slag also for samples of Example 2. As is clear from FIGS. 1 and 2, the refractory of the present invention is remarkably characterized in that dissolution into slag is kept on a low level for both the main component MgO and the second component oxide.

Example 4

Samples having the compositions shown in Table 2 were prepared, and sample pellets were prepared in the same manner as in Example 1 to investigate erosion resistance. As a result, an excellent resistance was confirmed for all samples as shown in Table 2.

TABLE 2

| Sample | Components | Amount of second Component | Erosion Resistance |
|---|---|---|---|
| 11 | MgO—TiO$_2$ | 10% | ⊚ |
| 12 | MgO—TiO$_2$ | 40% | ○ |
| 13 | MgO—Nb$_2$O$_5$ | 20% | ⊚ |
| 14 | MgO—Nd$_2$O$_3$ | 20% | Δ |
| 15 | MgO—La$_2$O$_3$ | 20% | ○ |
| 16 | MgO—Mn$_3$O$_4$ | 20% | ○ |
| 17 | MgO—NiO | 20% | ○ |
| 18 | MgO—Co$_3$O$_4$ | 20% | Δ |
| 19 | MgO—TiO$_2$ | 1% | Δ |
| 20 | MgO—Nb$_2$O$_5$ | 1% | Δ |
| 21 | MgO—Nd$_2$O$_3$ | 1% | Δ |
| 22 | MgO—La$_2$O$_3$ | 1% | Δ |
| 23 | MgO—Mn$_3$O$_4$ | 1% | Δ |
| 24 | MgO—NiO | 1% | x |
| 25 | MgO—Co$_3$O$_4$ | 1% | x |

Note: 1) Symbols ⊚, ○, Δ and x have the same meanings as in Table 1. The content of the second component is indicated in wt. %.

2) Samples 11 to 23 are examples of the present invention, and samples 24 and 25 are comparative examples.

Example 5

As shown in Table 3, sample pellets were prepared in the same manner as in Example 1 for examples including two kinds of second component and examples including Al oxide, to investigate erosion resistance. As a result, an excellent erosion resistance was confirmed for all samples, as shown in Table 3.

TABLE 3

| Sample | Components | Weight percentage (wt. %) | Erosion resistance |
|---|---|---|---|
| 26 | MgO—TiO$_2$—Al$_2$O$_3$ | 80:10:10 | ○ |
| 27 | MgO—Nb$_2$O$_5$—TiO$_2$ | 80:10:10 | ○ |
| 28 | MgO—Mn$_3$O$_4$—TiO$_2$ | 80:10:10 | ○ |
| 29 | MgO—TiO$_2$—Al$_2$O$_3$ | 89:10:1 | ○ |
| 30 | MgO—TiO$_2$—Al$_2$O$_3$ | 70:10:20 | Δ |

Note: Figures given in the column of wt. % represent ratios of individual components of MgO—(Ti, Nb, Mn) oxide-(Al, Ti) oxide.

Example 6

MgO powder comprising particles having a particle size of up to 100 μm and TiO$_2$ having a particle size of up to 50 μm were sufficiently mixed together at a ratio of 9:1. The mixture was then formed into a blind pipe shape having a length of about 20 cm, an outside diameter of 20 cm and a thickness of 5 mm under a pressure of 1.5 tons/cm$^2$, and was fired in an electric arc furnace at 1,500° C. for an hour. The fired blind pipe had an apparent specific gravity of 3.44 g/cm$^3$, a true specific gravity of 3.62 g/cm$^3$ and an apparent porosity of 5%.

The above-mentioned pipe was used as a protecting tube of a sheath-type thermocouple and immersed in a calcium ferrite slag (composition: Fe$_2$O$_3$: 70, CaO: 15, Cu$_2$O: 15) discharged from a copper refining furnace to measure temperature. The measured temperature (1,250° C.) was stabilized in 15 minutes and an accurate measured value was obtained. After a lapse of two hours, the measuring tube was taken up from this slag to observe the exterior: no crack or surface erosion was observed. Another pipe having the same shape and diameter was prepared from commercially available high-purity alumina (porosity: 5%), and a similar test was carried out using this pipe as a protecting tube. The immersed portion of the protecting tube was completely eroded within 30 minutes.

Example 7

MgO powder having a particle size of from 40 μm to 200 μm in an amount of 80 wt. % and TiO$_2$ powder having a particle size of from 40 μm to 200 μm in an amount of 20 wt. % were mixed, formed into a rectangular prism under a pressure 1,500 kg/cm$^2$, and fired in the open air at 1,500° C. for 48 hours into a 10 cm×10 cm×5 cm brick. This sample brick had an apparent specific gravity of 3.07 g/cm$^3$, a true specific gravity of 3.63 g/cm$^3$ and an apparent porosity of 15.43%. This sample brick was immersed in a calcium ferrite slag (composition in wt. %: Fe$_2$O$_3$: 70, CaO: 15, Cu$_2$O: 15; corresponding to a type of slag formed in copper smelting) at a temperature of 1,300° C. for 48 hours to form an oxide layer on the surface of the sample brick. Observation of this oxide layer through EPMA permitted confirmation, as shown in FIG. 4, that a composite oxide layer A comprising MgO—TiO$_2$—Fe$_2$O$_3$ (MgO: 40 wt. %, TiO$_2$: 35 wt. %, Fe$_2$O$_3$: 19 wt. %) was formed on the surface of the refractory C, and the interior E of the refractory was covered with this surface layer A. In FIG. 4, D is slag, and a special phase B is formed in the portion thereof in contact with the surface layer A of the refractory. A brick having an outermost layer A having a thickness of 2 mm was obtained by removing layers D and B by grinding.

This brick was immersed in 6 kg of the above-mentioned slag. The slag was sampled with a steel rod at certain intervals of time and the amounts of $TiO_2$ and MgO dissolved into the slag were measured. It was confirmed as a result that the measured amounts were on a very low level of up to 0.1 wt. % and up to 1.0 wt. %, respectively, and there was no remarkable change with time, thus suggesting an excellent erosion resistance.

Example 8

Sample bricks were prepared in the same manner as in Example 7 except that Nb oxide, Nd oxide, La oxide, Mn oxide, Ni oxide and Co oxide were used in place of Ti oxide. After forming an oxide layer on the brick surface by immersing the brick in the same slag, a brick having an outermost layer A was obtained by removing the outermost layers D and B. EPMA analysis of this oxide layer on the brick surface permitted confirmation that the oxides were ternary composite oxides each comprising $MgO—Fe_2O_3$ and the above-mentioned second component oxide.

During immersion of this sample brick in the slag, the slag was sampled with a steel rod at certain intervals of time to measure the amounts of the second component oxide and MgO dissolved into the slag. The results were on a very low level of within a range of from 0.3 to 0.05 wt. % and up to 2.0 wt. %, respectively. There was no marked change with time, thus suggesting an excellent erosion resistance.

Example 9

MgO powder having a particle size of from 40 $\mu$m to 200 $\mu$m in an amount of 95 wt. % and $Fe_2O_3$ having a particle size of from 1 $\mu$m to 40 $\mu$m in an amount of 5 wt. % were mixed together, formed into a rectangular prism under a pressure of 1,500 kg/cm$^2$, and fired in the open air at 1,500° C. for 48 hours into a brick. This brick was dipped in a melt of copper oxide containing Mn oxide (92% $Cu_2O$—8% $Mn_2O_3$) at a temperature of 1,200° C. to form a ternary composite oxide layer comprising $MgO—Fe_2O_3—Mn_2O_3$ on the brick surface, and then taken out for cooling.

A brick covered with an outermost layer A was available by removing the layers D and B in the same manner as in Example 7. This brick was immersed in the slag, and the slag was sampled with a steel rod at certain time intervals to measure the amounts of $Mn_2O_3$ and MgO dissolved into the slag. The results were on a very low level of up to 0.1 wt. % and up to 1.0 wt. %, respectively, and no marked change with time was observed, thus proving an excellent erosion resistance.

Example 10

A nickel-chromium alloy was sprayed onto a one-end-sealed pipe made of SUS (length: 20 cm, outside diameter: 20 mm, thickness: 1 mm) to form a primer having a thickness of from 0.1 to 0.15 mm, and then $MgO—TiO_2—Fe_2O_3$ powder (MgO: 42%, $TiO_2$: 37%, $Fe_2O_3$: 21%) was sprayed by a powder flame spraying method into a thickness of about 0.1 to 0.2 mm. A thermocouple was inserted into this protecting tube, and the temperature of a calcium ferrite slag ($Fe_2O_3$: 70 wt. %, CaO: 15 wt. %, $Cu_2O$: 15 wt. %) discharged from a copper refining furnace was measured. The measured temperature (1,250° C.) was stabilized in 15 minutes, thus revealing the possibility of stable measurement for more than two hours. After a lapse of two hours, the measuring tube was taken up, and the exterior was observed. No crack or surface erosion was found. A tube of the same shape and the same diameter was prepared, on the other hand, from a commercially available high-purity alumina (porosity: 95%), and a similar test was carried out on the thus prepared protecting tube. The immersed portion of the protecting tube was completely eroded within 30 minutes. When a similar test is applied to a one-end-sealed pipe of SUS with no further treatment, the tube is completely eroded in a few minutes.

Example 11

MgO powder (40 wt. %), $Fe_2O_3$ powder (20 wt. %) and $TiO_2$ powder (40 wt. %) having a particle size of up to 100 $\mu$m were mixed into a slurry, which was applied into a thickness of from 1 to 2 mm onto the surface of a non-fired refractory brick comprising MgO powder. The resultant refractory was fired in the open air at 1,450° C. for two hours to prepare a brick. This brick was immersed in a slag in the same manner as in Example 7, and slag was sampled with a steel rod at certain time intervals to measure the amounts of $TiO_2$ and MgO dissolved into the slag. The results were on a very low level of up to 0.1 wt. % and up to 1.0 wt. %, respectively. No particular change with time was observed. An excellent erosion resistance was thus confirmed.

EFFECTS OF THE INVENTION

The basicity-resistant refractory of the present invention has a very excellent erosion resistance against, for example, a calcium ferrite slag generated in copper smelting/refining, a basic slag containing large amounts of iron oxides such as ferrite cement, and a calcined mass. The refractory of the present invention having a porosity of the same order as that of ordinary bricks is, therefore, particularly useful in uses that would pose problems with a conventional Mg oxide-Cr oxide refractory brick, such as a refractory brick for lining a smelting/refining furnace for smelting/refining a basic melt rich in iron oxides. The refractory of the present invention having a high sintering density and hence excellent in thermal conductivity and thermal shock resistance, is useful as a crucible, a furnace tube and a protecting tube for various sensors coming into contact with a high-temperature melt. Unlike the conventional Mg oxide-Cr oxide refractory brick, the refractory of the present invention does not contain Cr oxide that may cause pollution. It does not, therefore, require any special treatment for disposal after service, and is thus advantageous also from the point of view of environmental control.

What is claimed is:

1. A basicity-resistant refractory comprising a substratum which is a sintered refractory and, as a surface layer thereon, a sintered oxide mixture comprising particles of magnesium oxide which is a main component, and particles of an oxide which is a second component and which is one or more oxides selected from the group consisting of titanium oxide, niobium oxide, neodymium oxide, lanthanum oxide, manganese oxide, nickel oxide and cobalt oxide and forms a composite oxide with magnesium oxide and iron oxides through reaction with iron oxides in a melt or a calcined mass.

2. A basicity-resistant refractory as claimed in claim 1, wherein the content of the oxide which is the second component is within a range of from 0.1 to 50 wt. %.

3. A basicity-resistant refractory as claimed in claim 1, wherein said composite oxide contains aluminum oxide in an amount within a range of from 1 to 20 wt. %, in addition to the oxide which is the second component.

4. A basicity-resistant refractory as claimed in claim 1, wherein the substratum is a sintered refractory comprising oxides having the same composition as the substratum surface layer.

5. A basicity-resistant refractory as claimed in claim 1, wherein the sintered oxide mixture comprises iron oxides in addition to magnesium oxide and the second component oxide.

6. A basicity-resistant refractory as claimed in claim 5, wherein the composite oxide is $MgO$—$TiO_2$—$Fe_2O_3$.

7. A basicity-resistant refractory as claimed in claim 1 which is in the form of a brick for lining a smelting-refining furnace.

8. A basicity-resistant refractory as claimed in claim 1 which is in the form of a brick for a melt transfer runner.

9. A basicity-resistant refractory as claimed in claim 1 which is in the form of a thermocouple protecting tube.

10. A basicity-resistant refractory as claimed in claim 1 which is in the form of a radiation tube for an optical pyrometer.

11. A basicity-resistant refractory comprising a substratum which is a sintered refractory and, as a surface layer thereon, a mixture of oxides comprising magnesium oxide which is a main component; an oxide which is a second component and which is one or more oxides selected from the group consisting of titanium oxide, niobium oxide, neodymium oxide, lanthanum oxide, manganese oxide, nickel oxide and cobalt oxide and forms a composite oxide with magnesium oxide and iron oxides; and an iron oxide, said sintered refractory substratum comprising a sintered mixture of oxides comprising particles of magnesium oxide which is a main component, and particles of said oxide which is a second component.

12. A basicity-resistant refractory comprising a substratum and as a surface layer on the substratum, a ternary solid-solution composite oxide obtained by (1) providing on the surface of the substratum a sintered oxide mixture comprising particles of magnesium oxide which is a main component, and particles of an oxide which is a second component and which forms said ternary solid-solution composite oxide with magnesium iron oxides and iron ixodes in a melt or calcined mass and (2) contacting said sintered oxide mixture with a melt or calcined mass containing iron oxides to form said ternary solid-solution composite oxide.

13. A basicity-resistant refractory as claimed in claim 12, wherein said sintered oxide mixture also comprises aluminum oxide in an amount of 1 to 20 wt. % based on the weight of the oxide mixture.

14. A basicity-resistant refractory as claimed in claim 12, wherein said sintered oxide mixture also comprises iron oxides.

15. A basicity-resistant refractory as claimed in claim 12, wherein said substratum is a sintered refractory comprising oxides having the same composition as said sintered oxide mixture.

* * * * *